June 18, 1946.  W. C. JAEGLE  2,402,406
VALVE
Filed Oct. 19, 1943  2 Sheets-Sheet 1

INVENTOR
WILLIAM C. JAEGLE
BY
Ramsey, Kent & Chisholm
ATTORNEYS

June 18, 1946.  W. C. JAEGLE  2,402,406
VALVE
Filed Oct. 19, 1943  2 Sheets-Sheet 2

INVENTOR
WILLIAM C. JAEGLE
BY Ramsey, Kent & Chisholm
ATTORNEYS

Patented June 18, 1946

2,402,406

UNITED STATES PATENT OFFICE 2,402,406

VALVE

William C. Jaegle, Plainview, Long Island, N. Y., assignor to Herman Strahman, Sr., Livingston, N. J.

Application October 19, 1943, Serial No. 506,798

1 Claim. (Cl. 251—77)

This invention relates to valves such as are used to control the flow of steam, water, air and other gases and liquids in pipe lines or the like.

An object of the invention is to provide a very simple structure, economical to manufacture and easy to assemble, and having incidental characteristic features that to a considerable extent insures automatically the tightness of seal of the more important members of the cooperating sealing parts when the valve is in shut-off position; and also makes it possible to adjust the packing about the usual plunger rod that is the prime operating element, without requiring any disassembly of major parts (e. g., valve-body and bonnet).

Other objects and aims of the invention, more or less broad than those stated above, will appear in the course of the following description of the elements, combinations, and arrangements of parts constituting the invention, taken in connection with the drawings forming part of this specification and in which I have illustrated an embodiment of the invention as at present preferred.

In the accompanying drawings, wherein like reference characters identify the same parts in the different figures.

Figure 1:
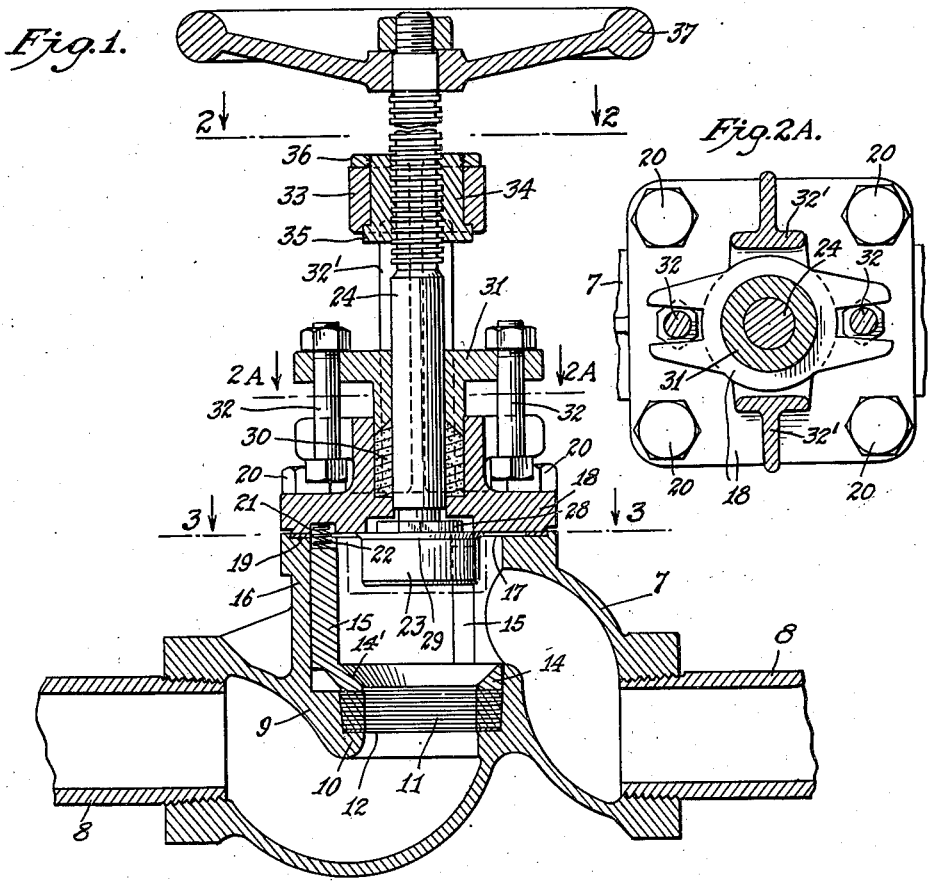
Figure 1 is a vertical sectional view, partly in elevation, showing the complete valve in fully open position, so that flow of fluid through it is unrestricted, and showing clearly the back-seal of the plunger that makes possible the adjustment of the plunger or plug stem packing while normal flow through the valve continues.
Figure 2A:
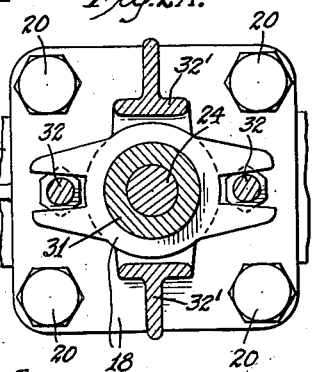
Figure 2A is a sectional view, with parts appearing in plan, taken on the line 2A—2A of Fig. 1.
Figure 2:
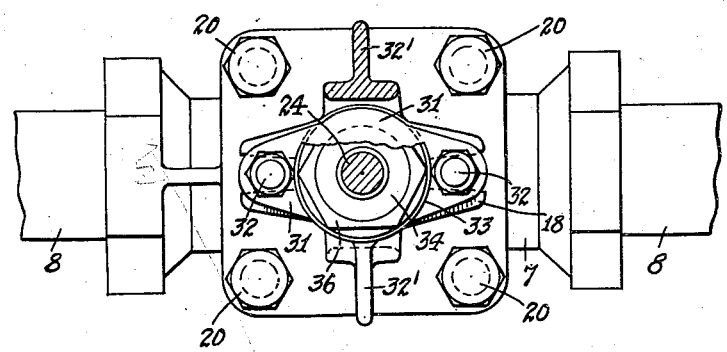
Figure 2 is a sectional view, with parts appearing in plan, taken on line 2—2 of Fig. 1.
Figure 3:
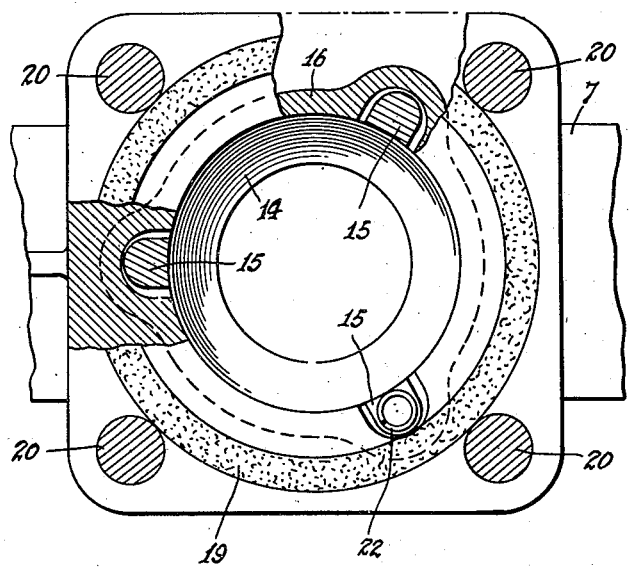
Figure 3 is a sectional view, with parts broken away and parts appearing in plan, taken on line 3—3 of Fig. 1.
Figure 4:
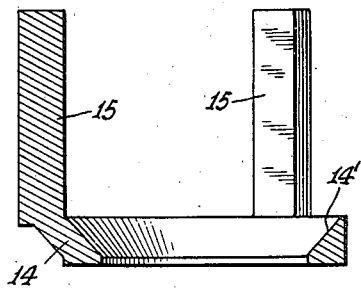
Figure 4 is a detail, partly in section and partly in elevation, of what is hereinafter termed the floating compression ring and its guide posts.
Figure 5:
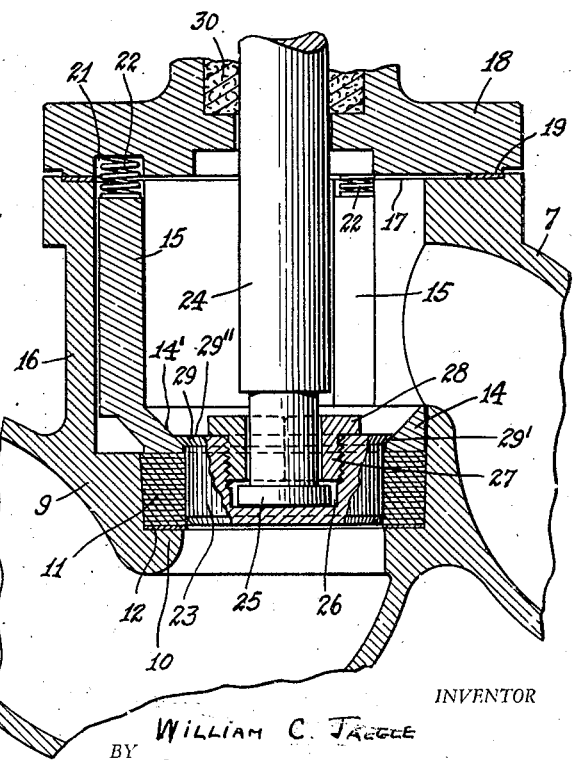
Figure 6:
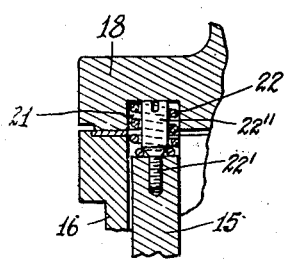

Figure 5 is a view partly in section and partly in elevation and with parts broken away, showing the valve body, the bonnet thereon with interposed gasket, the relation of the shut-off plug or plunger and of the compression ring to each other and to the main sealing ring when the plug has descended to effectively interrupt communication between the inlet and outlet ports of the valve; and Figure 6 is a detail in section showing the valve-body with a compression ring recessed in the valve-body (see in this connection Fig. 3), and the follower spring for that post having one end reacting against the top of the post and the other end seated in an appropriate recess in the bottom face of the bonnet, and designed and effective, with the similar and similarly related springs, to urge the floating compression ring against the top surface of the main sealing ring (compare Figs. 1 and 5).

Referring to the numerals on the drawings, and first to Fig. 1, there is shown at 7 a valve-body with interiorly threaded inlet and outlet ports to receive the ends of conduits 8. Between the ports the body is formed with a generally horizontal platform 9 through which there is a generally cylindrical opening of size to permit the flow of fluid from port to port, and surrounded at its lower end and defined by a shelf 10. Above the shelf 10 the platform is sufficiently thick to allow for the reception of and seating upon the shelf of a main sealing ring 11. Ring 11 will be of suitable dimensions and may be made of laminated asbestos packing material or other material suitable for the purposes of the invention; the lower face of the ring may be faced with a thin layer 12 of copper or other soft metal, firmly adherent to the body of the ring, and designed to facilitate detachment of the ring from shelf 10 when it becomes desirable to remove the ring, e. g., when replacement is necessary. If desired, and for reasons hereinafter explained, the side wall of the ring recess may be slightly tapered or flared from bottom to top, as shown in Figs. 1 and 5.

In contact with the smooth top surface of sealing ring 11 is the corresponding bottom surface of compression ring 14, and springing upwardly from this compression ring 14 is a plurality of guide posts 15, each recessed or set back into the interior vertical wall 16 of the valve body to reduce interference with the flow of fluid through the body, and reaching almost to the top edge 17 of the same.

Above the valve body is a bonnet 18, and between the opposed conforming surfaces of body and bonnet is a gasket 19 which seals the parts together when they are drawn one against the other upon manipulation of a set of bolts and nuts 20 passing through both of them and adapted and related for the intended purpose, as shown and as will be obvious.

In the lower face of bonnet 18 is a spaced series of sockets 21, one for each post 15, and each socket receiving the upper end of a coiled compression spring 22, the other end of which may be secured to the corresponding post 15, as by means of screws 22'. The purpose of these springs is to exercise a constant but limited downward pressure on the main sealing ring via compression ring 14.

The screws 22' have elongated cylindrical heads 22'' which extend upwardly through the springs 22 for engagement with the bonnet 18. Their purpose is to provide positive stops for the compression ring 14 should there be any tendency for it to follow the upward movement of the plunger 23 when the latter is withdrawn from the sealing ring 11 to open the valve.

A cylindrical plug or plunger 23 preferably of metal is suitably fixed, with slight capacity for universal movement, at the lower end of a valve stem 24 that travels up and down in the bonnet and moves plug 23 into and out of the interior of sealing ring 11. Thus, the end of the stem may be enlarged as at 25, entered into a socket 26 in the plug, and held therein by a split nut 27 headed over the socket at 28 and surrounding a reduced portion of the length of the stem above enlargement 25.

Surrounding the upper end of plug 23 is a flange 29, whose lower face 29' is inclined to match the correspondingly inclined face 14' of the compression ring with which it contacts when the plug is moved to the Fig. 5 position. The upper face of flange 29 is flat as at 29'', to make sealing contact with a corresponding surface of the bonnet when the parts are in the Fig. 1 position.

When plug 23 is in the Fig. 5 or closed position there is a seal between its side walls and the interior walls of ring 11. Limit of downward movement of plug 23 is determined mainly by the travel of the valve stem; and to some extent by the compressibility of ring 11 both axially and cross-axially; by the relation between the outer diameter of the plug and the inner diameter of the ring, as well as the cross-axial wall thickness of the ring as related to the depth of the ring in the axial aspect. In this matter of design the taper of the side walls of the recess in which ring 11 is seated should be carefully determined, because the compression ring 14, under the urge of the downwardly moving plunger, squeezes the ring material with components acting radially inward of the ring to provide or increase the frictional effort and therefore the seal between plug and sealing ring. Such components, largely of vertical origin, are increased by tapering the side walls of the ring recess, as shown.

Similarly the springs 22 will be designed and their relations to cooperating parts chosen so that the plug will not exert excessive and harmful frictional drag on the ring when the plug is moved from the Fig. 5 to the Fig. 1 position.

30 indicates the usual packing for the valve stem, put under sealing compression by gland 31 under control of nuts and bolts 32. Servicing of this stem packing may be accomplished while the valve is full open, by reason of the seal between surface 29'' of flange 29 and the opposed surface of the bonnet.

32' indicates yoke arms extending upwardly from the bonnet and merging in a ring-like member 33, in which is held by a drive fit an interiorly threaded bushing 34, headed at the bottom as at 35 to make contact with ring 33, the assembly being completed by a nut 36. The interior threads of bushing 34 engage corresponding threads on the valve stem, so that on manipulation of hand-wheel 37 the desired travel of the stem can take place.

What I claim is:

A valve comprising a body provided with inlet and outlet ducts and a valve port portion between said ducts, said port portion having an inwardly-flanged recess therein for the reception and support of a sealing member, a substantially cylindrical sealing member of slightly yieldable and deformable material replaceably received within said recess, a valve plunger guided co-axially with respect to said recess and contiguously receivable within said sealing member to close the valve, means for forcing said plunger into and out of said sealing member, and means for applying distributed axial pressure upon said so-received sealing member, said means comprising a ring bearing upon the end face of said sealing member which is remote from said recess flange, a plurality of uniformly circumferentially distributed parallel posts integral with and extending outwardly from said ring and means bearing upon the outer end of each of said posts in the direction of said sealing member, said posts each lying flush in an individual slot-like recess in said valve body and constituting fillets therein defining, with the thus multi-slotted valve body, a substantially smooth unobstructed fluid passage.

WILLIAM C. JAEGLE.